April 26, 1966   V. M. LEONARD   3,247,751
METHOD OF AND APPARATUS FOR TEACHING MUSIC
Filed Sept. 1, 1964   2 Sheets-Sheet 1
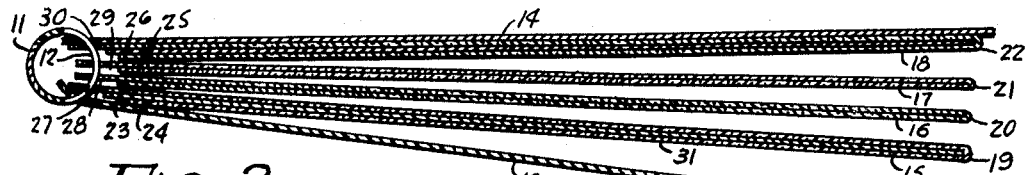
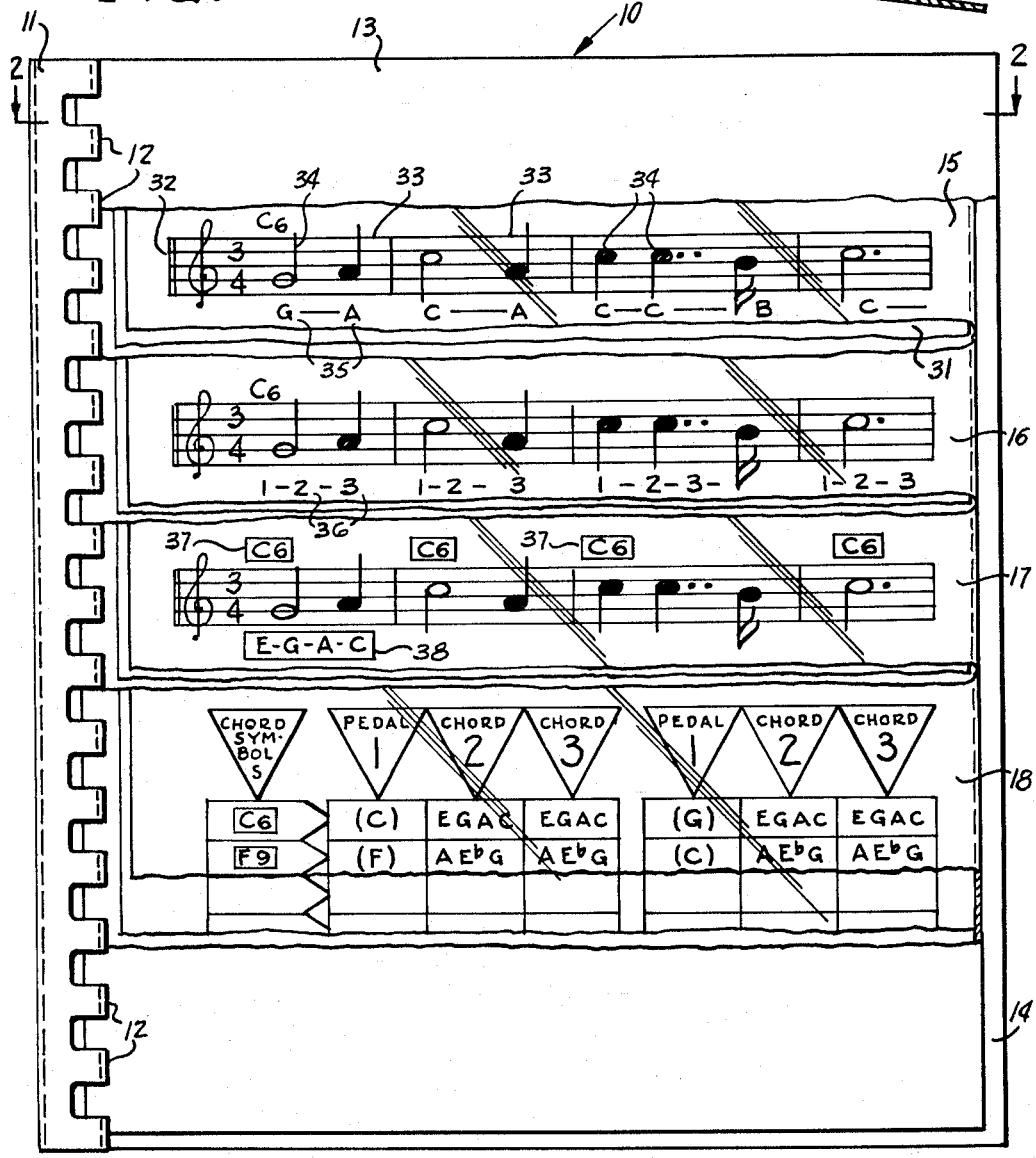
INVENTOR.
VERNA M. LEONARD April 26, 1966  V. M. LEONARD  3,247,751
METHOD OF AND APPARATUS FOR TEACHING MUSIC
Filed Sept. 1, 1964  2 Sheets-Sheet 2

INVENTOR.
VERNA M. LEONARD
BY
Kimmel & Crowell
ATTORNEYS.

United States Patent Office

3,247,751
Patented Apr. 26, 1966

3,247,751
METHOD OF AND APPARATUS FOR
TEACHING MUSIC
Verna M. Leonard, 6312 E. Liberty, Fresno, Calif.
Filed Sept. 1, 1964, Ser. No. 393,673
7 Claims. (Cl. 84—471)

This invention relates to a method of and apparatus for teaching music, and has particular applicability to a method and apparatus for teaching an individual who does not read music to play a specific selection on a musical instrument, more particularly an organ.

A primary object of this invention is the provision of a simple method and apparatus for teaching individuals who are desirous of playing particular selections on the organ to play such selections without the necessity of imparting to such individuals a thorough course of training in music and playing technique. An additional object of this invention is the provision of a system of this nature, and apparatus for carrying out the method, which will permit an untrained individual to first learn to recognize a key correlated with a particular musical symbol, to then recognize the time at which the selection is to be played, and finally by a system of letter designation to determine the keys to be depressed to form a particular chord corresponding to the individual note. Means are also provided for correlating the pressure of appropriate foot pedals, as well as chords to be played by the left hand, with the selected individual chord to be played by the right hand, all being designated by clear, simple and easy to read letter symbols which may be instantaneously identified with the particular key or pedal, in order that the individual may in a relatively short time and with a minimum of effort and difficulty learn to play a given selection.

A further and more specific object of the invention is the provision for apparatus for carrying out the method of the instant invention which comprises a series of bound transparent envelopes each bearing letter indicia on the face thereof, and the sheets being so aligned that the indicia of each selected sheet corresponds to a measure of a sheet of music bearing the simple melody to be played, selectively and progressively inserted in the series of envelopes.

More specifically an object of the instant invention is to provide a series of envelopes, to be employed in association with a single sheet of music bearing a particular melody or selection written in its simplest form and so arranged that the first sheet bears indicia which is in letter form so that the melody may be translated to the depression of individual keys, the second sheet bears correlated indicia for determining the time at which the selection is to be played, the third sheet bears similar correlated indicia indicating in letter form the chords which are to be struck corresponding to the individual notes by the right hand of the player, and the final sheet indicates also in correlated form the related chords to be played by the left hand as well as the particular pedal of the organ to be depressed while playing such chords.

An additional specific object of the invention resides in the provision of appropriate structure including a series of transparent envelopes bound in a single volume of book form, and bearing indicia thereon correlated to a single individual sheet of music which is selectively and progressively placed in the envelopes in order to effect a step by step method of teaching a relatively untrained individual to play a specific selection on the organ.

Other objects will in part be obvious and in part be pointed out as the description of the invention proceeds and shown in the accompanying drawings wherein there is illustrated a preferred embodiment of this inventive concept.

In the drawings:

FIGURE 1 is a front elevational view of one form of device employed in the method of the instant invention, individual envelopes contained interiorly thereof being broken away, a portion of the individual indicia on each envelope being selectively repeated one below the other to indicate all the steps of the method, whereas in actual practice the showing of the four envelopes in the particular arrangement would be positioned one directly behind the other;

FIGURE 2 is a sectional view taken along line 2—2 of FIGURE 1 as viewed in the direction of the arrows;

Similar reference characters refer to similar parts throughout the several views of the drawings.

Figure 3:
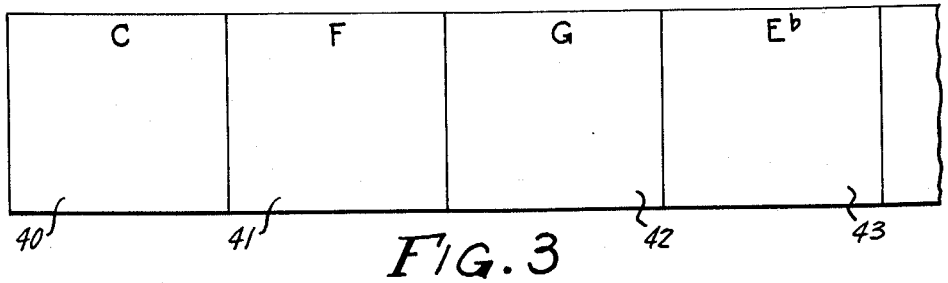
FIGURE 3 is a plan view of an auxiliary form of apparatus used in conjunction with the instant invention.

Having reference now to the drawings in detail there is generally indicated at 10 a device in the form of a leaved book used in conjunction with the method of the instant invention. The book 10 includes a binder 11 including separable rings 12, whereby sheets may be transposed, removed, or inserted. A front cover sheet of cardboard other desired material 13 is provided as well as a rear cover sheet 14. Interiorly of the envelope are a plurality of transparent envelopes 15, 16, 17 and 18 respectively, each of which comprises a doubled or reverted sheet of completely transparent material, folded back on itself as at 19, 20, 21 and 22 respectively. The reverted ends 23, 24, 25 and 26 of the sheets terminate short of the ends toward which they are folded, 27, 28, 29 and 30, the latter ends being provided with openings to be engaged by the rings 12. The reverted sheets are thus open at their inner ends, and open at their tops and bottoms, whereby a printed sheet of music 31 may be slipped selectively into each individual envelope, the sheet being shown in FIGURE 2 as being positioned in envelope 15.

The sheet of music contains a sufficient number of bars 32 of an individual musical selection divided into appropriate measures 33, each of which contains a series of musical notes 34. These bars are printed for each individual selection on the opaque sheet 31. When the sheet is inserted in the first envelope 15 below each note there will be provided a letter 35, such as G, A, C, A, indicating the individual keys of the organs which are to be depressed in order to sound each individual note. These keys may be designated in any desired manner as by letter symbols, or by means of a key chart such as that disclosed in my Patent No. 2,938,421, issued May 31, 1960. Thus with the sheet of music in envelope 15 an individual may strike a single key for each note on the sheet of music, thus familiarizing himself with the melody as played on individual organ keys therein. After this step of the method has been achieved, the sheet 31 is removed from the envelope 15 and placed in the envelope 16, which bears a series of numbers 36, the numbers being 1–2–3, as indicated in FIGURE 2, and being apportioned to each measure of the bar so as to indicate to the player the proper time in which the particular selection is to be played. The player or student then familiarizes himself with the individual time and beat and plays the measures accordingly. After the mastery of this step the individual sheet is transferred to envelope 17, which is provided with a series of chord indicia 37, above each note for which the chord is to be struck. Below the indicia 37 is a block 38 containing indicia indicative of the particular keys to be simultaneously depressed to achieve the particular chord. For example, in the illustrative example herein shown the chord C6 is produced by depressing the keys E, G, A, C, and each time the symbol C6 appears above a note, as it does above the half notes in the first, second and fourth measures, and the quarter note in the third measure the student will depress the keys E, G, A and C to produce that particular chord. Similarly when other chords such as the subdominant F, the dominant augmented G7 or the dominant G, or any others, the particular keys to be struck will be indicated the first time this chord symbol appears, and each time that that particular chord symbol appears subsequently that chord will be struck.

After the individual or student has mastered the recognition, the timing, beat or rhythm and the chords, the sheet may be removed from the pocket 17 and transferred to the fourth pocket 18 therein. Here the individual or student will see the familiar chord symbols previously learned in conjunction with the right hand on the chart defined in envelope 17, as well as in certain instances as certain others, together with an indicia for the pedal to be pushed in playing the organ, as well as the second and third chords to be struck with the left hand. Obviously after the student has mastered all of this he will be able to play a particular selection on an organ, with a degree of proficiency which would normally be achieved only after many tedious hours of learing to read the music, and translate it to the keys. By virtue of this method learning an individual piece may be accomplished in a relatively short time, and after the student has mastered one piece additional charts relating to other pieces may be obtained for learning as many more pieces as the student may desire so that his repertoir may be increased progressively, rapidly and with a minimum of time and effort.

While the arrangement has been specifically defined for use with teaching the organ, it may also be adapted for piano, accordion, guitar, and other instruments, by various slight and obvious modifications.

Basically the method of the instant invention analyzes each unit count in one measure of music. Each count in a measure has a definite purpose in relation to rhythm, and the chart herein described provides a student with a visual picture of the purpose of each count. By the use of the method and apparatus of the instant invention the use of counting in accordance with note values is eliminated. Instead of placing a whole count of value and a half a count of value for each written note as in standard note value music the student is trained to comprehend notes in groups. Modern teaching methods have established that it is just as easy mentally to retain a group of related items in the mind as it is to retain a single item therefore the method of the instant invention trains the student to mentally and visually file in his mind all of the notes which fall on a given count. In counting note reading the value of each note is mentally weighed even if there are two to eight notes in the given count, and this process materially retards the student's sight reading, and of course causes faltering in the rhythm. As a student becomes more capable of mentally analyzing the purpose of each given count of a measure the more quickly he will become adept at physical coordination of the muscles which are used in playing. The muscle training includes the eyes, the hands, and the feet all of which must be properly trained in order to perform with musical perfection. By virtue of the apparatus of the instant invention and its correlated method the student quickly comprehends that the organ pedals perform on count one and three repeatedly, and the understanding he gains from the chart materially accelerates his rate of learning. This is extremely difficult in note reading from conventional music.

Figure 4:
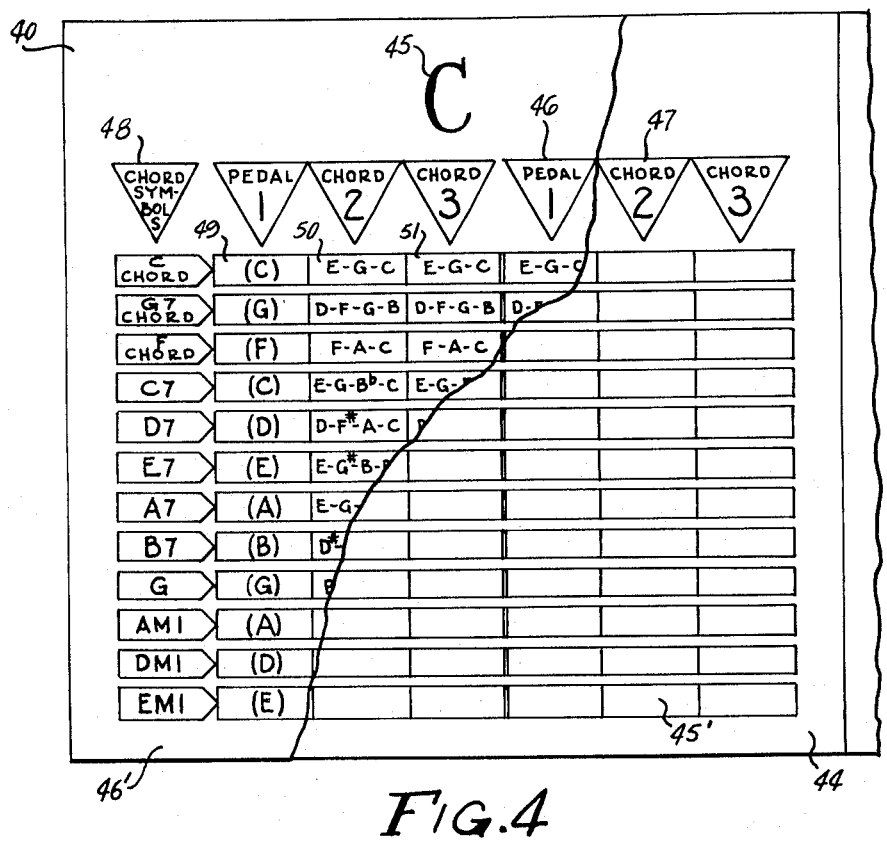
FIGURE 4 is a plan view partially broken away disclosing one of the individual sections of the apparatus of FIGURE 3 bearing suitable indicia.

A modified form of teaching chart is disclosed in FIGURES 3 and 4. FIGURE 3 discloses a series of chord charts, generally indicated at 40, 41, 42 and 43, the charts respectively for the keys of C, F, G and Eb those most frequently used, although other chords may be added as desired. Each chart consists as best shown in FIGURE 4 of an opaque or translucent sheet 44, bearing the letter 45 designating the individual key and a series of indicia 46 and 47 indicating pedal and chord movements. The sheet is divided into a plurality of blocks 45' and is adapted to be inserted selectively in an envelope 46', the envelope 46' being that of the key of C or 40 in FIGURE 3, but each envelope bearing a different series of indicia. For example, under the heading 48, chord symbols, will be found the appropriate designation of all the chords appurtenant to the key of C. In the illustrative embodiment only the standard chords are shown but it will be understood that this may be expanded to include all the modern chords and those which may be subsequently found to be important in modern music. In alignment with each designation will be the pedal designation 49 appropriate to the particular chord, and adjacent thereto in aligned columns are found the chord letter symbols 50 and 51 appropriate to the second and third chords of a measure for example, all indicated by letter symbols which may be readily comprehended by a student and visually translated into specific keys to be played. Obviously by virtue of the charts of FIGURES 3 and 4 the student may readily learn all of the chords for a given key, or keys, and then transfer this knowledge as his proficiency in learning increases to the playing of a specific piece in accordance with the apparatus of FIGURE 1.

From the foregoing it will now be seen that there is herein provided an improved method of an apparatus for accelerating the teaching of music to an individual who does not read music, which accomplishes all of the objects of this invention and others, including many advantages of great practical utility and commercial importance.

As many embodiments may be made of the inventive concept, and since many modifications may be made of the embodiments hereinabove shown and described, it is to be understood that all matter herein is to be interpreted merely as illustrative and not in a limiting sense.

I claim:

1. Apparatus for teaching music to an individual who does not read notes comprising in combination a book including a cover and a back, a plurality of transparent sheets reverted at substantially their midpoints to form double pages defining envelopes which are transparent on both sides, removably bound between said covers along the inner edge of one side of each reverted sheet only, prepositioned indicia on at least one of the transparent double pages, an opaque sheet insertable in each envelope, and musical indicia on said printed sheet correlated with said prepositioned indicia on said envelope.

2. The structure of claim 1 wherein the first reverted transparent sheet bears indicia designating the individual notes of each measure of the sheet of music, the indicia of a second sheet indicates the time of the measure, the next sheet indicates the chord to be played by the right hand corresponding to the note and the final sheet bears indicia directing foot pedal operation and the chord to be played by the left hand simultaneously with the right hand chord, and each opaque sheet carries the musical symbols of a particular selection.

3. The structure of claim 1 wherein the envelopes formed by the reverted sheet are open at their top and bottom edges and at the side edge adjacent the binding.

4. The structure of claim 1 wherein the transparent envelopes bear different indicia on opposite sides whereby the sheet of music may be reversed in the same envelope to achieve two steps of the teaching method.

5. The structure of claim 1 wherein the correlated indicia for each measure of music on the sheets of music on each transparent sheet is aligned with the corresponding indicia for that measure of each other transparent sheet.

6. Apparatus according to claim 1 for teaching all of the chords in a selected key wherein one printed sheet has indicia in the form of blank blocks and additional indicia indicative of pedal selection and a series of charts and that transparent sheet reverted to form an envelope into which a printed sheet may be inserted bears indicia correlated with said blocks indicative of particular keys to be depressed to form all the chords in the selected key.

7. Apparatus according to claim 1 wherein a series of transparent envelopes bearing indicia for all the chords of all the common keys are linearly connected along their adjacent edges to form a series of envelopes.

References Cited by the Examiner

UNITED STATES PATENTS

| | | | |
|---|---|---|---|
| 1,053,366 | 2/1913 | Dickson | 84—483 X |
| 1,436,771 | 11/1922 | Meling | 84—473 |
| 1,868,823 | 7/1932 | Goodrich | 35—9 |
| 2,271,772 | 2/1942 | Maffei | 84—483 |
| 2,327,907 | 8/1943 | Knox | 84—472 |
| 2,516,485 | 7/1950 | Rogers | 84—477 |
| 2,564,616 | 8/1951 | Telasco | 84—473 |
| 2,619,867 | 12/1952 | Frisch | 84—475 |
| 2,718,169 | 9/1955 | Barnes | 84—480 |
| 2,944,349 | 7/1960 | Kaufman | 84—482 X |

FOREIGN PATENTS 362,589   7/1962   Switzerland.

OTHER REFERENCES

"Slide-A-Chord" publication, Slide-A-Chord Co., New York, February 1962.

LEO SMILOW, *Primary Examiner.*